United States Patent [19]

Ferguson et al.

[11] 4,447,739
[45] May 8, 1984

[54] ROTOR WITHDRAWAL ARRANGEMENT FOR BULB GENERATORS

[75] Inventors: James H. Ferguson; Murray W. Calderwood, both of Peterborough, Canada

[73] Assignee: Canadian General Electric Company Limited, Toronto, Canada

[21] Appl. No.: 372,126

[22] Filed: Apr. 27, 1982

[30] Foreign Application Priority Data

Jun. 19, 1981 [CA] Canada .................................. 380253

[51] Int. Cl.³ ........................ F03B 3/10; F03B 11/10; G03B 13/10
[52] U.S. Cl. ...................................... 290/52; 290/54; 415/500
[58] Field of Search ............................ 290/52, 43, 54; 415/500, 219 R; 310/42

[56] References Cited

U.S. PATENT DOCUMENTS 4,151,970  5/1979  Bernhard et al. .................. 248/637

FOREIGN PATENT DOCUMENTS 778497  2/1968  Canada .................................. 290/52
1051749  4/1979  Canada .

Primary Examiner—B. Dobeck
Assistant Examiner—Shelley Wade
Attorney, Agent, or Firm—Raymond A. Eckersley

[57] ABSTRACT

Apparatus for withdrawing the rotor from the stator in a bulb-type generator makes the rotor and the inner portion of the stator accessible for repair or maintenance without having to disassemble the housing and stator. A pair of detachable beams are placed in the housing when the rotor is stationary so they extend through holes provided in the rotor above the shaft on which the rotor turns. The beams are conveniently mounted to the upper stay tower structure at their downstream end, and to the housing at their upstream end. An additional support member may be used between the beams and the bottom of the housing at the upstream end of the beams. Shoes which slidably engage the beam are placed between the beam and the rotor to support the rotor. Preferably the shoes include a hydraulically operated piston which can be extended to ensure positive engagement with the beam. The rotor has an inner ring which is bolted to a driving disc on the shaft. The bolts are removed and a hydraulic jack is used to slide the rotor outwards along the beams clear of the stator.

6 Claims, 4 Drawing Figures

ROTOR WITHDRAWAL ARRANGEMENT FOR BULB GENERATORS

BACKGROUND OF THE INVENTION

This invention relates to bulb-type generators, that is, to duct mounted turbine generator assemblies, and in particular it relates to an arrangement for withdrawing the generator rotor for maintenance or repair.

The so-called bulb-type generators, or more commonly bulb generators, are assemblies of a turbine and generator in a generally bulb-shaped housing that is mounted horizontally in a water conducting conduit or duct. The generator may be installed through a hatch in the duct wall normally directly above the generator portion of the housing, that is, the upstream portion of the housing. Once the installation is complete the hatch in the duct wall is covered and the generator access is restricted to an access tower that extends between the bulb-shaped generator housing and the duct wall. The tower is frequently circular in cross-section, and it is smaller than the hatch opening used for installation. As the access tower is in the water path it is desirable to keep it small in size to minimize the disturbance and restrictions of water flow for greater efficiency. When maintenance or repair of the generator rotor assembly or the inside of the stator assembly was required in the past, the generator would have to be dismantled and either removed in sections through the hatch opening or temporarily placed in the water passage.

SUMMARY OF THE INVENTION

It is therefore an object of this invention to provide a bulb type generator where the rotor may be withdrawn from the stator while remaining within the generator housing.

The present invention provides an arrangement where the generator rotor may be withdrawn into the housing without dismantling the housing or disturbing the cover over the hatch in order to expose the inner surfaces of the rotor and stator for maintenance or repair. This reduces the down time of the generator and simplifies repair.

Accordingly there is provided a rotor withdrawal apparatus for a bulb-type generator having a bulb-shaped housing adapted for mounting within a water conducting duct, a rotatable shaft supported within said housing having an upstream and a downstream end, said downstream end projecting from said housing with turbine blades mounted on the projecting end, a generator stator mounted within said housing and in axial alignment with said shaft, a generator rotor, generator rotor driving means for detachably coupling said rotor to said shaft and for supporting said rotor for rotation within said stator, said apparatus comprising detachable beam means for mounting within said housing when said rotor is stationary, said beam means being parallel to the axis of said shaft for supporting said rotor, shoe means engaging said beam means and said rotor for sliding movement along said beam means, and means for applying a force to said rotor after said rotor driving means has been detached for moving said rotor in an upstream direction with said shoe means travelling along said beam means.

DESCRIPTION OF THE PREFERRED EMBODIMENTS

Figure 1:
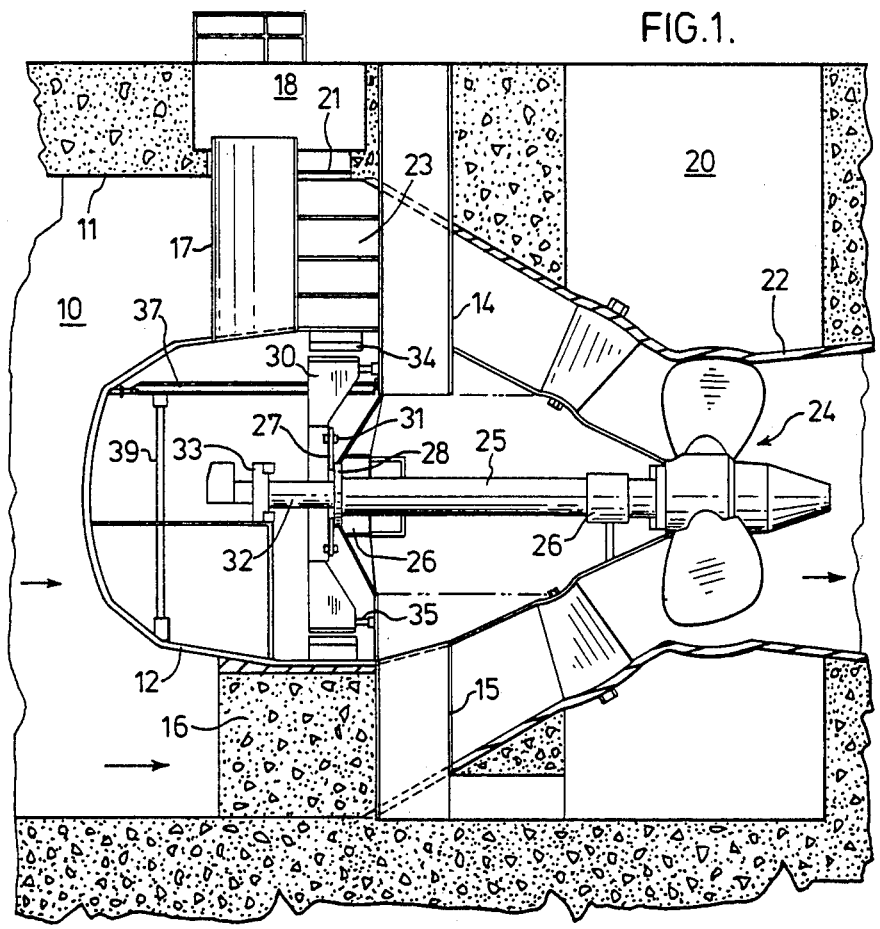
FIG. 1 is a sectional view taken through the water carrying duct and showing the bulb generator mounted in the duct.

Referring now to FIG. 1, a duct or conduit 10 has walls 11 formed with concrete. Mounted axially within the walls 11 is a bulb-shaped housing 12. The housing 12 is supported in duct 10 by an upper stay tower 14 and a lower stay tower 15 which are embedded in the concrete walls. Additionally the housing 12 is mounted to a lower pier 16 with an access tower 17 extending upwards through a hatch cover 21 to hatch opening 18. The hatch opening 18 provides access to the generator portion of the bulb housing during construction while a turbine pit 20 provides access to the turbine portion of the bulb housing during construction. The hatch opening 18 is closed between the outer walls of access tower 17 and the walls of opening 18 with a hatch cover 21. The turbine pit 20 is closed, flush with the walls 11, with a lining 22 of steel or other suitable material. This forms a smooth duct wall.

Preferably a plate structure 23 extends between the access tower 17 and the adjacent upper stay tower 14, projecting downstream a short distance beyond tower 14, to form an overall streamlined structure with a generally teardrop cross-section. Similarly the lower pier 16 is of a streamlined shape blending with lower stay tower 15. The arrangement may have a plate structure extending downstream a short distance to form a generally teardrop cross-section.

The turbine 24 is carried by a shaft 25 supported in bearing structures 26. On the upstream end of a shaft 25 is mounted a driving disc 27 bolted to shaft flange 28. A generator rotor 30 is bolted to the driving disc 27 with bolts 31. A collector support 32 extends from the end of shaft 25 to a collector housing and brush assembly 33. The housing 33 includes brushes which engage collector rings on the shaft. The collector rings are connected to the rotor field for carrying field current to the rotor. A stator 34 surrounds the rotor and is mounted to bulb housing 12.

It is important not only to have access to the generator at all times, but also to be able to maintain and service the generator in an economical and efficient manner.

Figure 2:
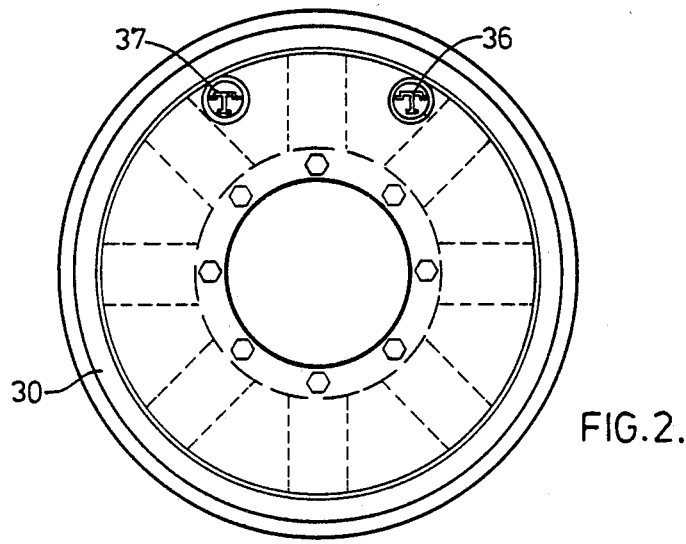
FIG. 2 is a simplified end view of the generator rotor assembly with the location of the support beams indicated.

When it is desired to perform maintenance or repair on the generator, it can be done with little trouble. The rotor 30 can be withdrawn to make rotor 30 and the inside of stator 34 accessible. Before the rotor 30 can be withdrawn, any components which would inhibit withdrawal are first removed through access tower 17. The turbine/generator is, of course, stopped. This is normally done by shutting the wicket gates just upstream of the turbine and stopping the flow of water. The flow of water may be stopped by other external means. The brakes 35 may be used to stop rotation more quickly as the turbine slows. Then the two beams 36 and 37 are installed, extending through holes in the rotor 30 as seen in FIG. 2. The beams are mounted at the downstream end to stay tower structure 14 and at the upstream end to housing 12, and support members 38 and 39 may be installed to assist in supporting beams 36 and 37 respectively.

Figure 3:
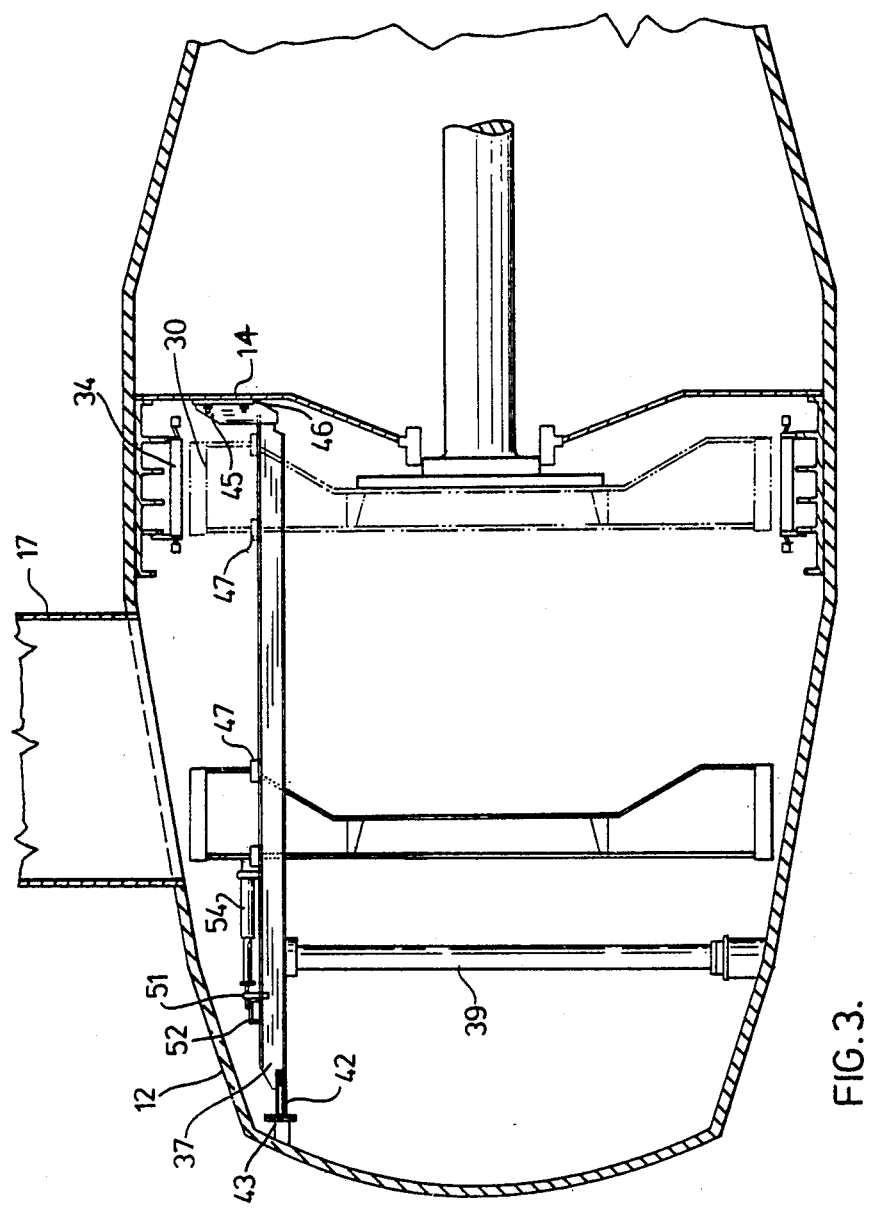
FIG. 3 is a side view, partly in section, of the upstream portion of the bulb housing showing the generator rotor assembly in its normal and its withdrawn position.
Figure 4:
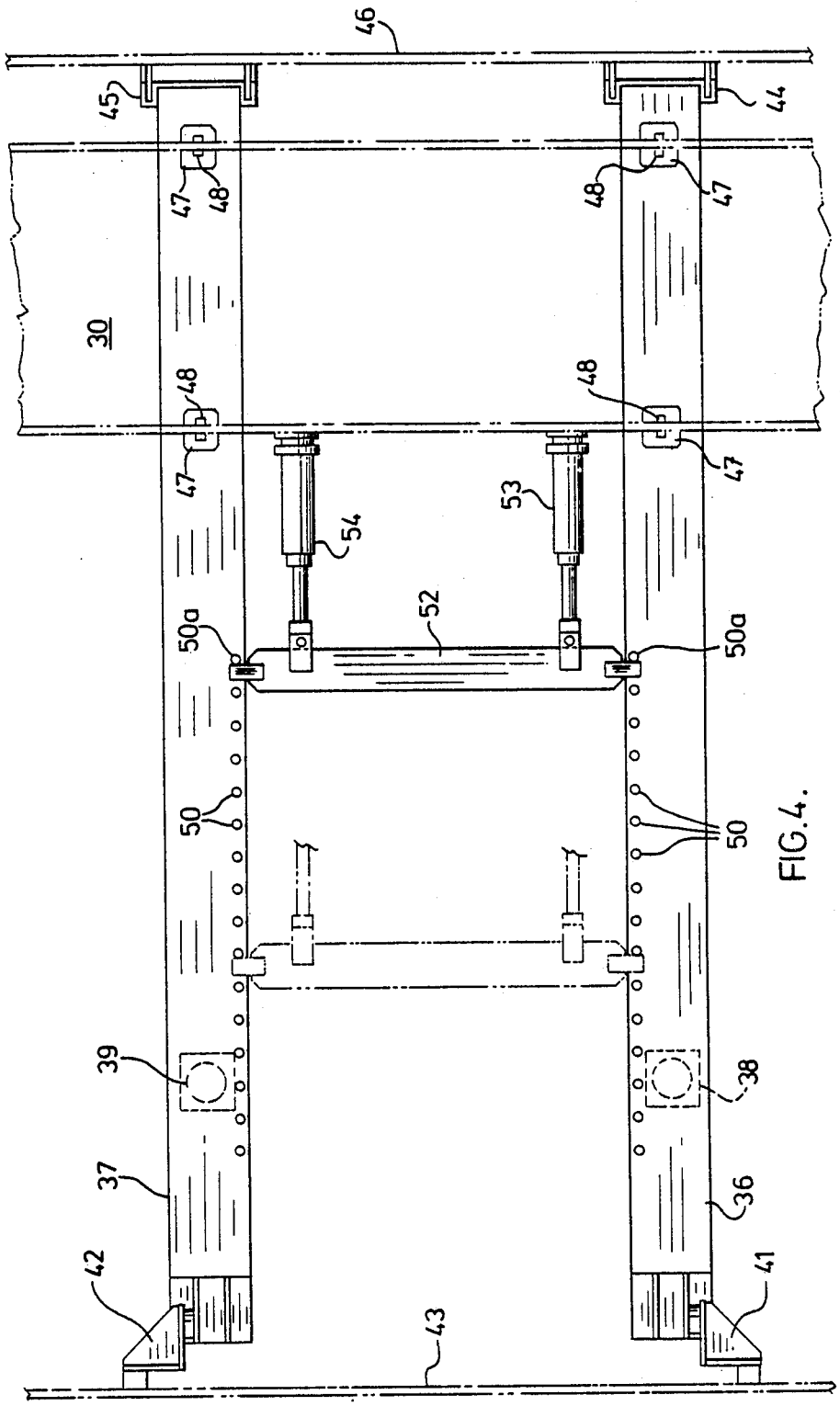
FIG. 4 is an overhead view of the support beams and withdrawing mechanism.

The beams 36, 37 and supports 38, 39 and associated components are better described with reference to FIGS. 3 and 4. As can be seen, beams 36 and 37 are fastened to housing 12 by brackets 41 and 42 respectively and a cross-member 43. At the other end, beams 36 and 37 are fastened to stay tower structure 14 by brackets 44 and 45 respectively, and by a cross-member 46 which may extend transversely to the walls of housing 12.

Once the beams 36, 37 are secure with supports 38, 39 in place, sliding shoes 47 are placed on the upper surface of each beam 36, 37 in engagement with the upper surface of the beam and the upstream and downstream sides of rotor 30. Preferably the shoes 47 include a hydraulically operated piston 48 with limited vertical travel that can be used to raise and lower rotor 30 slightly when necessary.

Bolts 31 (FIG. 1) can now be removed and the rotor 30 is completely supported by shoes 47 on beams 36, 37. The beams 36, 37 are provided with a series of spaced holes 50 with each hole in beam 36 being opposite a hole in beam 37. Studs 51 are now placed in suitable ones of holes 50, shown in FIG. 4 as holes 50a, and cross-beam 52 placed across beams 36, 37 engaging studs 51. Jacks 53, 54 are secured to cross-beam 52 and engaged with the upstream side of rotor 30. Retraction of jacks 53, 54 will withdraw rotor 30 an initial distance. This is repeated with the studs 51 placed farther along beams 36, 37 until the rotor is withdrawn the required distance. Preferably the jacks 53, 54 are operated from the same source of hydraulic pressure (not shown) that is used to operate the pistons 48 in sliding shoes 47.

When maintenance or repair is completed, the operation is reversed. The studs 51 are placed in appropriate opposite holes 50, the cross-beam 52 engaged with the studs 51 for pushing, and the jacks 53, 54 extended. This is repeated until rotor 30 is against driving disc 27 (FIG. 1). Slight vertical adjustment of rotor 30 is made, as required, by pistons 48 so that the rotor can be centered and secured to driving disc 27 by bolts 31 (FIG. 1). Once the rotor is secured, the beams 36 and 37 are disassembled, support members 38 and 39 are disassembled, and these parts stored. Any auxiliary components that were removed are re-installed and the generator is ready to be place in service.

It will be seen that the procedure for repair and maintenance of the generator has been made more efficient and time out of service reduced.

What we claim as new and desire to secure by Letters Patent of the United States of America is:

1. Rotor withdrawal apparatus for a bulb-type generator, comprising
    a bulb-shaped housing adapted for mounting within a water conducting duct,
    a rotatable shaft supported within said housing and having an upstream end and a downstream end, said downstream and projecting from said housing and having turbine blades mounted thereon for rotation of said shaft with movement of water through said duct,
    a generator stator mounted within said housing and in axial alignment with said shaft,
    a generator rotor having an inner ring and a peripheral rim with radially extending spaced apart pole structure therebetween,
    generator rotor driving means for detachably coupling said rotor to said shaft and for supporting said rotor for rotation within said stator,
    at least one detachable beam for mounting within said housing when said rotor is stationary, said at least one beam extending parallel to the axis of said shaft and passing through holes provided in said rotor,
    shoe means for slidable engaging said at least one beam and engaging said rotor for supporting said rotor for sliding movement along said at least one beam, and piston means for applying a force to said rotor after said rotor driving means has been detached from said rotor for moving said rotor in an upstream direction clear of said stator.

2. Rotor withdrawal apparatus as defined in claim 1 in which said generator rotor driving means is a driving disc mounted to said shaft and having a surface at right angles to the axis of said shaft, the inner ring of said rotor engaging said surface of said driving disc, and bolts extending through said ring and said disc for detachably fastening said rotor to said shaft.

3. Rotor withdrawal apparatus as defined in claim 1 in which said at least one detachable beam is a pair of parallel beams mounted above the axis of said shaft and equally spaced to either side of a vertical plane through the axis of said shaft.

4. Rotor withdrawal apparatus as defined in claim 3 in which said shoe means is an upstream and a downstream shoe for each of said beams, the upstream shoes engaging a respective upstream portion of said rotor and the downstream shoes engaging a respective downstream portion of said rotor.

5. Rotor withdrawal apparatus as defined in claim 4 and further comprising in each said shoe a hydraulically operated piston having limited vertical controlled movement for raising or lowering to engage said rotor or to raise or lower said rotor.

6. Rotor withdrawal apparatus as defined in claim 1 in which said piston means is a hydraulically operated jack having at one end means to engage said at least one detachable beam and having at the other end means to engage said rotor.

* * * * *